July 21, 1925.  C. A. STENGER  1,546,416
SPRING SHACKLE
Filed Dec. 13, 1922
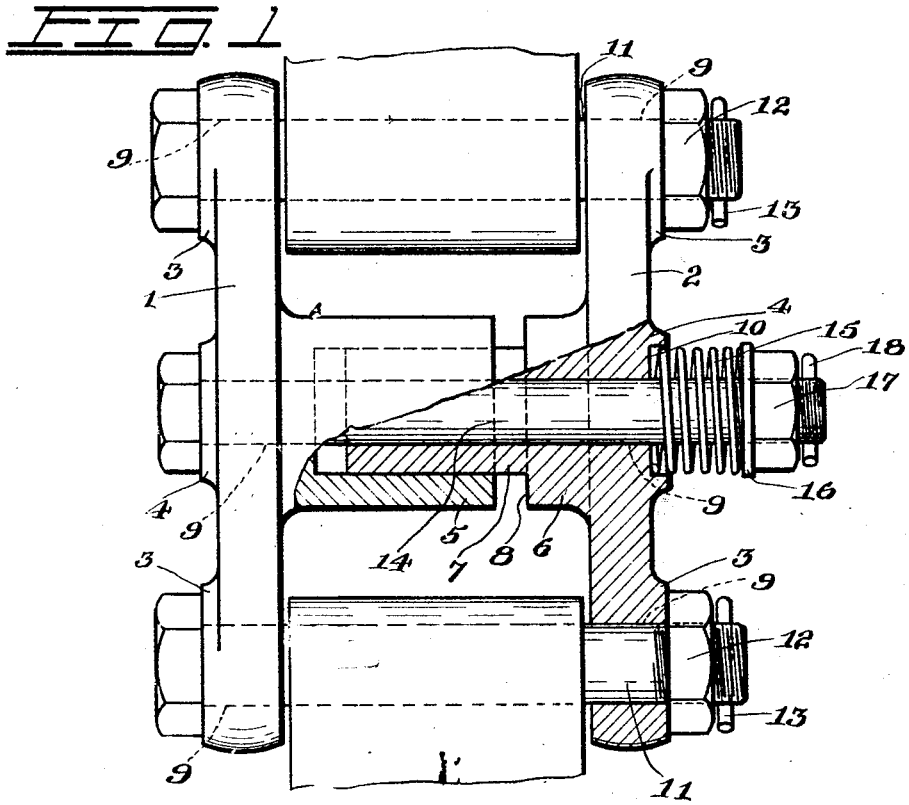
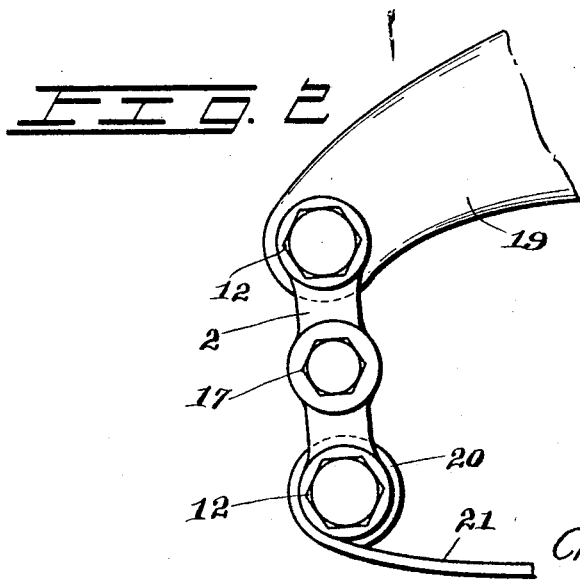
INVENTOR
Clarence A. Stenger
By *Mann Fenwick Lawrence*
ATTORNEYS Patented July 21, 1925.

1,546,416

UNITED STATES PATENT OFFICE.

CLARENCE A. STENGER, OF SEATTLE, WASHINGTON.

SPRING SHACKLE.

Application filed December 13, 1922. Serial No. 606,626.

*To all whom it may concern:*

Be it known that I, CLARENCE A. STENGER, a citizen of the United States, residing at Seattle, in the county of King and State of Washington, have invented certain new and useful Improvements in Spring Shackles; and I do hereby declare the following to be a full, clear, and exact description of the invention, such as will enable others skilled in the art to which it appertains to make and use the same.

This invention relates to improvements in spring shackles, and more particularly to shackles for holding the ends of automobile or vehicle springs to the chassis or other parts of the said automobile or vehicle.

An object of the invention is to provide a suitable spring shackle which will be so constructed as to provide a slidable adjustment between the several parts so that adjustment can be made to suit the varying conditions of the several parts.

Another object of the invention is to provide a spring shackle having slidably adjustable side plates and also resilient means for compensating for the wear between said plates.

A further object of the invention is to provide a spring shackle which will be so constructed as to provide the highest possible efficiency with a low cost of manufacture.

Other objects will appear as the description proceeds.

In the accompanying drawings which form a part of this application,—

Figure 1 is a front elevation of my improved spring shackle showing a portion of the same broken away to more clearly show its construction, and Fig. 2 is a side elevation of my improved spring shackle shown connected, one end of the chassis with an end of a spring.

Like characters of reference are used throughout the accompanying drawings and the following specification to designate corresponding parts.

The spring shackle is formed of two spaced side plates or members 1 and 2, which have formed on their outer surfaces at their extremities and intermediate portions, the bosses 3 and 4.

The plate 1 is provided on its inner face and at its intermediate portion with a laterally extending integrally formed socket 5.

The side plate 2 is provided on its inner face and at a point intermediate its ends with an inwardly and laterally extending stud 6 which has formed thereon the stud 7 of smaller diameter, which construction provides a shoulder 8 adjacent the juncture of the two studs.

Openings 9 extend transversely through and at the opposite ends of the said side plates or members 1 and 2 and also through the central portion of the plates, socket 5 and studs 6 and 7.

A countersink or well 10 is formed in the outer face of the plate 2 at a point intermediate the ends of the said plate.

Pintles 11 are adapted to extend through the openings 9 at the opposite ends of the plates 1 and 2 to connect the same together, and receive the nuts 12 and cotterpins 13 to hold the same in operative position.

A longer pintle 14 extends through the openings in the central portions of the plates 1 and 2 and through the central portion of the hollow socket 2 and studs 6 and 7 and extends out beyond the countersink or well 10. A coil spring 15 is positioned about the end of the pintle 14 and seats within the said countersink 10. A washer 16 is slidably positioned over the end of the pintle 14 and engages the opposite end of the spring 15. A nut 17 and cotterpin 18 are placed adjacent the washer 16 to hold the said spring 15 contracted or compressed.

The end of the chassis 19 is adapted to pivotally engage the upper pintle 11 while the bearing 20 of the vehicle spring 21 is adapted to pivotally engage the lower pintle 11.

From the foregoing description it will be seen that, when the improved spring shackle is in position, when wear takes place due to friction between the several parts, the side plates would be forced closer toward each other due to the action of the coil spring 15, which also serves to keep the several parts from rattling. The shoulder 8 on the stud 6 serves to limit the lateral movement between the two side plates 1 and 2, but there remains sufficient distance between the end of the socket 5 and the shoulder 8 to permit of adjustment sufficient to compensate for the wearing of the several parts until they have been practically worn out.

Many minor changes in detail of description may be resorted to without departure from the spirit of the invention.

Having thus fully described my invention, I claim:

1. An adjustable spring shackle comprising spaced side members, said members being provided with openings through their ends and intermediate portions, a laterally extending hollow socket formed on one of said members, a cooperating laterally extending hollow stud formed on the other member and slidable in said socket, pintles through said openings, and resilient means for normally holding said members in adjusted position.

2. An adjustable spring shackle comprising spaced side members, said members being provided with openings through their ends and intermediate portions, a laterally extending hollow socket intermediately formed on one of said members, a laterally extending hollow stud formed on the other member and slidable in said socket, means for limiting the distance of approach between said members, and resilient means for normally holding said members in adjusted position to compensate for the wear between the several parts.

3. An adjustable spring shackle comprising spaced side plates, said members being provided with openings through their ends and intermediate portions, a laterally extending hollow socket intermediately formed on one of said members, a laterally extending hollow stud formed on the other member and being slidable in said socket, pintles extending through said openings and connecting said members, one of said members being provided with a spring retaining well or seat, a spring positioned about said intermediate pintle, and means for adjusting the resiliency of said spring.

In testimony whereof I affix my signature.

CLARENCE A. STENGER.